(12) United States Patent
Pino, Jr. et al.

(10) Patent No.: US 10,311,102 B2
(45) Date of Patent: Jun. 4, 2019

(54) SYSTEM, METHOD AND COMPUTER PROGRAM PRODUCT FOR PROCESSING VIDEO DATA

(71) Applicants: Angelo J. Pino, Jr., New York, NY (US); Mohammed Sattar, Bell Harbour, NY (US)

(72) Inventors: Angelo J. Pino, Jr., New York, NY (US); Mohammed Sattar, Bell Harbour, NY (US)

(*) Notice: Subject to any disclaimer, the term of this patent is extended or adjusted under 35 U.S.C. 154(b) by 0 days.

(21) Appl. No.: 15/194,842

(22) Filed: Jun. 28, 2016

(65) Prior Publication Data
US 2017/0032032 A1    Feb. 2, 2017

Related U.S. Application Data

(63) Continuation of application No. 12/728,681, filed on Mar. 22, 2010, now abandoned.
(Continued)

(51) Int. Cl.
| | |
|---|---|
| *G06F 16/78* | (2019.01) |
| *H04N 21/81* | (2011.01) |
| *H04N 5/445* | (2011.01) |
| *G06F 16/738* | (2019.01) |
| *G06F 16/783* | (2019.01) |

(Continued)

(52) U.S. Cl.
CPC ............ *G06F 16/78* (2019.01); *G06F 16/738* (2019.01); *G06F 16/7844* (2019.01); *H04N 5/445* (2013.01); *H04N 21/2668* (2013.01); *H04N 21/26603* (2013.01); *H04N 21/4668* (2013.01); *H04N 21/4756* (2013.01); *H04N 21/4828* (2013.01); *H04N 21/8405* (2013.01); *H04N 21/812* (2013.01)

(58) Field of Classification Search
CPC ......... G06F 17/30817; G06F 17/30796; G06F 17/3084; H04N 21/26603; H04N 21/2668; H04N 21/4668; H04N 21/4756; H04N 21/4828
USPC ......................................................... 725/34
See application file for complete search history.

(56) References Cited

U.S. PATENT DOCUMENTS

5,835,667 A * 11/1998 Wactlar ................ G11B 27/034
                                                          386/241
6,177,931 B1    1/2001 Alexander
(Continued)

*Primary Examiner* — Nathan J Flynn
*Assistant Examiner* — Tung T Trinh
(74) *Attorney, Agent, or Firm* — Jeffrey S. Melcher; Melcher Patent Law PLLC (57) ABSTRACT

A system, method and computer program product for processing video is provided. In one embodiment, the method includes storing a plurality of transcripts in a memory along with information identifying an associated video content unit, receiving a search request comprising one or more keywords originating from a user, searching at least some of the plurality of transcripts for the one or more keywords, determining search results that comprises a plurality of video content units that satisfy a similarity threshold with the search request, wherein the plurality of video content units that satisfy a similarity threshold with the search request comprise video content units having a transcript that includes at least some of the one or more keywords, and transmitting information identifying at least some of the video content units of the search results to a remote device for presentation to the user.

20 Claims, 5 Drawing Sheets

Related U.S. Application Data (60) Provisional application No. 61/162,844, filed on Mar. 24, 2009.

(51) Int. Cl.
  *H04N 21/266* (2011.01)
  *H04N 21/466* (2011.01)
  *H04N 21/475* (2011.01)
  *H04N 21/482* (2011.01)
  *H04N 21/2668* (2011.01)
  *H04N 21/8405* (2011.01)

(56) References Cited

U.S. PATENT DOCUMENTS

| | | |
|---|---|---|
| 6,282,713 B1 | 8/2001 | Kitsukawa |
| 6,408,270 B1 | 6/2002 | Garber |
| 7,269,837 B1 | 9/2007 | Redling |
| 2001/0001160 A1 | 5/2001 | Schoff |
| 2002/0066097 A1 | 5/2002 | Hattori |
| 2003/0208758 A1 | 11/2003 | Schein |
| 2004/0025180 A1* | 2/2004 | Begeja ............... H04N 7/17318 725/46 |
| 2006/0143236 A1* | 6/2006 | Wu ....................... G11B 27/034 |
| 2006/0212897 A1* | 9/2006 | Li ......................... H04H 60/58 725/32 |
| 2006/0248078 A1 | 11/2006 | Gross |
| 2007/0027751 A1 | 2/2007 | Carson |
| 2007/0112758 A1* | 5/2007 | Livaditis ............... G06F 16/338 |
| 2008/0033806 A1 | 2/2008 | Howe |
| 2008/0059453 A1* | 3/2008 | Laderman ........... G06F 16/3326 |
| 2008/0126303 A1* | 5/2008 | Park .................... G06F 16/735 |
| 2008/0172413 A1* | 7/2008 | Chiu ................... G06F 16/4387 |
| 2008/0182587 A1* | 7/2008 | Bennett ................ H04W 4/02 455/456.2 |
| 2008/0263103 A1* | 10/2008 | McGregor .......... G06F 21/6218 |
| 2009/0019009 A1* | 1/2009 | Byers .................. G11B 27/105 |
| 2009/0063561 A1* | 3/2009 | Sayko ................... H04N 19/17 |
| 2009/0271283 A1* | 10/2009 | Fosnacht ............. G06Q 20/123 705/26.1 |
| 2009/0287486 A1* | 11/2009 | Chang ................. G10L 15/063 704/235 |
| 2009/0299824 A1* | 12/2009 | Barnes, Jr. .......... G06F 3/04847 705/7.39 |
| 2010/0031193 A1* | 2/2010 | Stark ................... G11B 27/034 715/810 |
| 2010/0114991 A1* | 5/2010 | Chaudhary ............ G06F 16/41 707/809 |

\* cited by examiner

VIDEO SEARCH USER INTERFACE

301

SEARCH

SEARCH RESULTS 303

| CHANNEL | PROGRAM TITLE | TIME | DATE | RATING |
|---|---|---|---|---|
| YES NETWORK | YANKEES vs ORIOLES | 3:00 PM | 10/28/2009 | ★★★★★ |
| Text will be here. | Text will be here. | 7:00 PM | 10/28/2009 | ★★★★★ |
| Text will be here. | Text will be here. | 9:00 PM | 10/28/2009 | ★★★★★ |
| Text will be here. | Text will be here. | 10:00 PM | 10/28/2009 | ★★★★★ |

Figure 4

SYSTEM, METHOD AND COMPUTER PROGRAM PRODUCT FOR PROCESSING VIDEO DATA

CROSS REFERENCE TO RELATED APPLICATIONS

This application claims priority to U.S. Provisional Application No. 61/162,844, filed Mar. 24, 2009, which is hereby incorporated by reference in its entirety for all purposes.

FIELD OF THE INVENTION

The present invention generally relates to processing video data, and more particularly to a system, method and computer program product for processing, searching, sorting and rating video content.

BACKGROUND OF THE INVENTION

Set-top boxes connect televisions and other displays to external sources of video content data. Many interactive set-top boxes allow users to choose to view one of a plurality of video content units (e.g. movies, television programs, etc.). Each day the amount of available video content increases and, therefore, finding desirable video content is becoming more and more challenging to the user. Users can search for content by title or, in some instances, by other information. However, the title, for example, is often not representative of the subject matter of the video content unit. Consequently, if a user does not know the title of the video content unit, he or she may not be able to find video content of interest.

Often the dialogue of a video content unit (spoken by persons in the video content unit) will contain audio content that is representative of the subject matter of the video content unit. However, users are typically unable to search for video content based on phrases used within the audio portion of the video content.

In addition, in many instances even though the user has searched or otherwise found a video (hereinafter also referred to as a video content unit) that the user believes may be of interest (e.g., contains the desired subject matter), he or she has no information about the quality of the video. Generally, television systems today do not allow users to rate the quality of the video content units viewed or to see the ratings of other users so that the user can make an informed decision to view or not view the video content unit.

Thus, there exists a need for a system, method and computer program product that facilitates searching of the audio content of a plurality of video content units for one or more keywords. In addition, there is a need to allow users to rate video content units and to sort search results based on the user ratings. These and other features may be provided by one or more embodiments of the present invention.

These features and advantages of the present invention will become more fully apparent from the following description and appended claims, or may be learned by the practice of the invention as set forth hereinafter.

SUMMARY OF INVENTION

The present invention provides a system, method and computer program product for processing video. In one embodiment, the method includes storing a plurality of transcripts in a memory along with information identifying an associated video content unit, receiving a search request comprising one or more keywords originating from a user, searching at least some of the plurality of transcripts for the one or more keywords, determining search results that comprises a plurality of video content units that satisfy a similarity threshold with the search request, wherein the plurality of video content units that satisfy a similarity threshold with the search request comprise video content units having a transcript that includes at least some of the one or more keywords, and transmitting information identifying at least some of the video content units of the search results to a remote device for presentation to the user. In addition, the method may include prompting users to rate video content units, storing an average user rating for video content units and displaying user ratings as part of the search results. In addition, advertisements may be selected, based on suggested keywords and keywords entered by the user.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description The present invention includes a system, method and computer program product which processes a plurality of compressed video content units to create a transcript of the audio dialogue contained in each video. The transcripts are stored in memory with information identifying the video from which it was processed. In response to search requests from users that include keywords and other parameters, the system searches the transcripts of the videos for the keywords and the videos satisfying a similarity threshold with the search request are sorted in accordance with the degree of their conformity to the search request, and then transmitted to the users. The present invention also includes means for receiving and storing subjective rating data received from users (e.g., who have watched all or part of a video) that are then associated in memory with the videos, and may additionally (or instead) sort the search results based on the average user rating associated with each video.

As used herein, the term video, video content unit, and content unit may be used interchangeably and refer to any available video content such as a movie, a television program (e.g., a sitcom, a television series, a comedy, an infomercial, a commercial, a documentary, news programming), a sporting event, etc.—any of which may comprise video on demand, pay per view, and a live (when possible) or a recorded content. In addition, such content may comprise multiple segments between which the broadcaster may insert other content units (e.g., commercials and/or news alerts).

Figure 1:
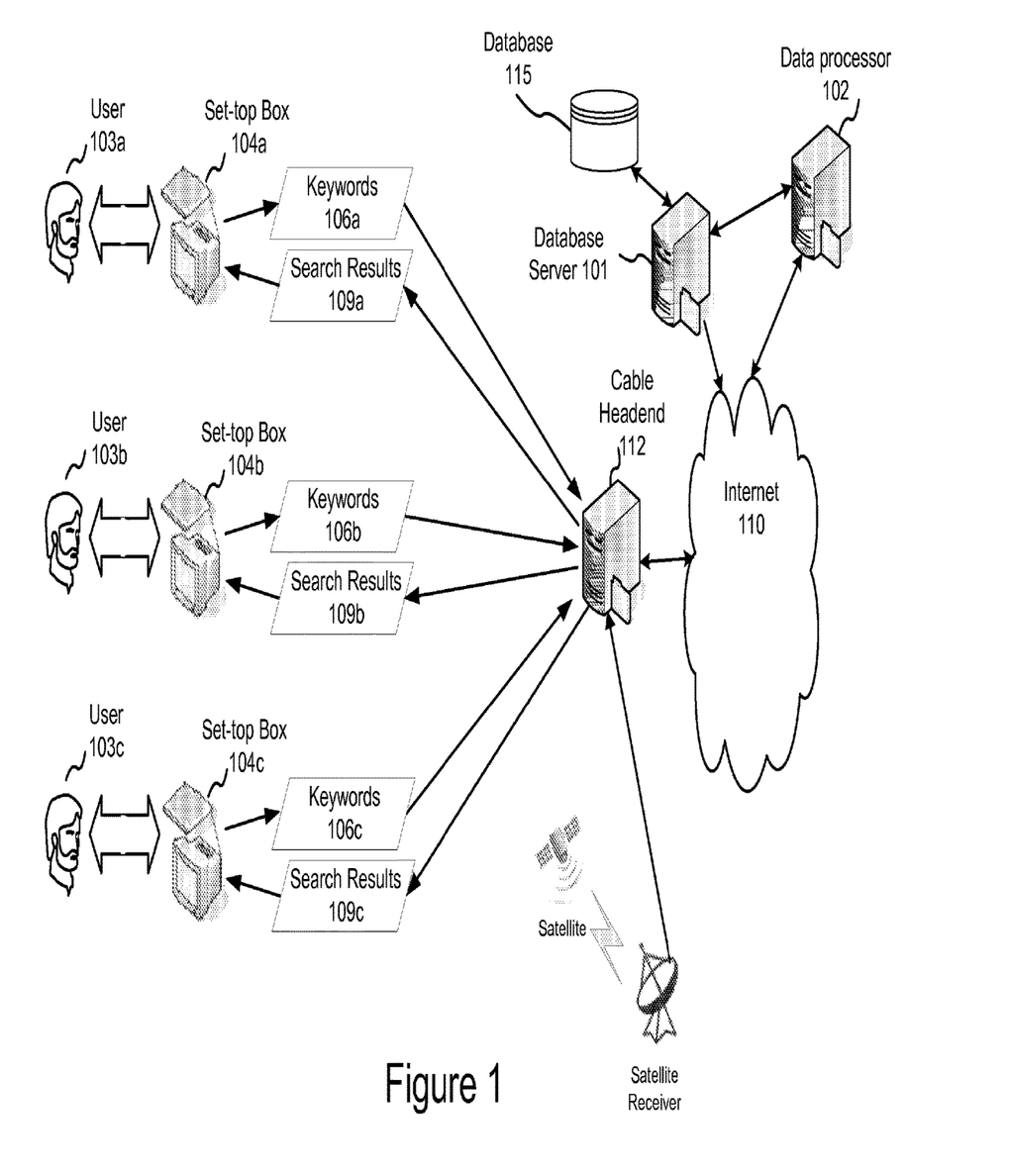
FIG. 1 is a diagram illustrating a system for practicing some embodiments of the present invention.

FIG. 1 illustrates a system for practicing embodiments of the present invention. The system includes a cable headend 112, a database server 101, a data processor 102, a database 115, a plurality of set-top boxes 104a-c, one or more video sources (e.g., satellite), and the internet 110. Some embodiments may include fewer, additional, or different components. For example, not all embodiments need to make use of the Internet and instead may include a local or private network.

The database server 101, in the shown embodiment, comprises a computer system (one or more co-located or distributed computers) or cluster executing one or more computer programs. The database server 101 may comprise any database management system (DBMS) or relational database management system (RDBMS) such as Oracle, DB2, IMS, MYSQL, MSSQL or any distributed database (or data warehouse). The database server 101 accesses the database 115, which may store the transcript of each video and information identifying the video from which each transcript was obtained. Database 115 may comprise a computer system (one or more co-located or distributed computers) executing one or more computer programs and also may store an average rating for each video content unit and the rating provided by each user for each video content unit. In some embodiments, a data warehouse comprised of multiple databases may be used as the storage system. In this embodiment, the database 115 may also store some videos. In other embodiments the videos may be stored elsewhere and remote from the location storing the transcripts.

The database server 101 may be configured to receive a search request from a user 103 that includes keywords 106a-c. In various embodiments, the DBMS or RDBMS managing the textualized digital transcripts and video content units reduces the search request to a query execution plan using hash tables and the like. In response to a search request, the database server 101 is configured to search the transcripts to identify associated video content units found to satisfy a similarity threshold with the search request 109.

In addition to storing transcripts, the database 115 may store additional information about each video content unit in various fields. Such information may include the channels on which the content is to be broadcast (e.g., Discovery Channel®, ABC®, ESPN®, etc.), a title, a subject, description (e.g., episode information), the speakers or creators of the audio in the video content unit, Motion Picture Association of American (MPAA) rating information, duration, availability dates (and times) of the video content units, pricing information associated with the content units (in any), the media type (e.g., high definition (HD) or not HD), the genre of media featured in the content units (e.g., drama, comedy, horror, sports, news, etc.) and the like. Users may provide search requests that include parameters for any of these fields in addition to keywords. In addition, the user may search based on the user rated such as searching for the highest rated content of a particular genre (e.g., comedy), the highest rated content at a particular time (e.g., at 2 PM, on now, or for the next time slot), or the highest rated content type (e.g., movie, television show, live broadcast, etc.). Thus, the database 115 may also store (or the system may access) electronic program guide information for video content that is not yet available (but is available at a future time).

In the illustrated embodiment, the database server 101 (or other computer system) provides video content units and search results to the set-top boxes 104a-c via the cable headend 112, such as video content units that have been requested by users 103a-c. In many embodiments, the video content units may be supplied from a first source and the search results from a second source.

Like the database server 101, the data processor 102, comprises a computer system (one or more co-located or distributed computers) executing one or more computer programs stored in a tangible medium. In this example embodiment, the data processor 102 accesses each video content unit to process the video content unit to obtain a transcript of the dialogue of each video content unit for storage in the database 115. Other data, such as non-keyword parameters, for each video content unit may be provided from metadata from any suitable source such as, for example, metadata from the source of the video content unit itself. In addition, the data processor 102 may also access live video content (e.g., received via a satellite receiver or other source) to convert the audio content to a transcript for storage. Thus, anytime after a live broadcast has started, the database 115 may include at least a portion of the transcript of the broadcasted video to allow users to search for keywords of live broadcasts currently available for viewing.

The data processor 102 may include the software and hardware necessary to access and process the video content such as a decoder to demultiplex MPEG compressed video content to obtain the closed caption content of the video. The data processor 102 may be functionally capable of demultiplexing content units, such as MPEG compatible (or compliant) video content units; analyzing the streams forming the video content units, such as elementary streams and program streams; remultiplexing content units (if necessary); and extracting audio data (such as the closed caption) from the content units.

Most of the world does not distinguish captions from subtitles. Subtitles, in the US, however, assumes the viewer can hear but cannot understand the language, so the subtitles translate dialogue and some on-screen text. Captions assumes the viewer is hearing impaired and aims to describe all significant audio content including spoken dialogue, non-speech information (such as the identity of speakers and their manner of speaking), along with music or sound effects using words or symbols. While the disclosed embodiment uses captions, other embodiments may use subtitles or captions and subtitles. As used herein, the term "audio text" is meant to collectively refer to subtitles and/or closed caption content that forms part of a video content unit or otherwise supplied apart from the system of the present invention.

The content units may be encoded in one of any number of various data encodings well-known to those of skill in the art created by various video compression codecs, such as H.261, Real Video and WMV. While the present invention is described in the context of extracting the closed caption content form compressed video, other embodiments may obtain the transcripts from other types of video.

NTSC programming captions are encoded into Line 21 of the vertical blanking interval. For ATSC (digital television) programming, three streams are encoded in the video: two are backward compatible Line 21 captions, and the third is a set of up to 63 additional caption streams encoded in EIA-708 format. EIA-708 captions are textual like traditional Line 21 captions. Captioning is transmitted and stored differently in PAL and SECAM countries, where teletext is used rather than Line 21, but the methods of preparation are similar.

The Line 21 data stream can consist of data from several data channels multiplexed together. Field 1 has four data channels: two Captions (CC1, CC2) and two Text (T1, T2). Field 2 has five additional data channels: two Captions (CC3, CC4), two Text (T3, T4), and Extended Data Services (XDS). XDS data structure is defined in EIA-608.

NTSC DVDs may carry closed captions in the Line 21 format and are sent to the display device by the DVD player and can be displayed with a television's built-in decoder or a set-top decoder as usual. Independent of Line 21, video DVDs may also carry captions as a bitmap overlay which can be turned on and off via the DVD player, just like subtitles. HD DVD and Blu-ray disc media cannot carry Line 21 closed captioning due to the design of High-Definition Multimedia Interface (HDMI) specifications that were designed to replace older analog and digital standards, such as VGA, S-Video, and DVI. Both Blu-ray disc and HD DVD can use either DVD bitmap subtitles (with extended definition) or advanced subtitles to carry SDH type subtitling, the latter being an XML based textual format which includes font, styling and positioning information as well as a unicode representation of the text. Thus, various means of obtaining the transcript of a video content unit may be used depending on the type of video content unit. In many instances, commercially available software may be employed such as, for example purposes only, Expert Caption® (or MPEGRepairHD) offered by PixelTools Corporation.

The data processor 102 is configured, in certain embodiments, to process the audio portions of the content units as they become available to the data processor 102. Thus, as new video content becomes available, data processor 102 may process the newly available video content units to obtain and store the transcripts (and other associated data) of each. In one example embodiment, the data processor 102 processes these video content units by demultiplexing packets within the content units. In the case of MPEG formatted content units, the audio and video portions of the content unit may be interleaved together into program streams. The program streams contain packets linked together by standard tables built when the content unit was multiplexed.

The data processor 102 creates a transcript from the caption data (which is thus a transcript of the dialog) and provides the transcript to the database server 101, which stores the transcript in the database 115 in association with information identifying the video content unit from which the transcript was obtained.

The cable headend 112 may comprise a master facility for interacting with set top boxes and transmitting video content units over a video content delivery system, such as a cable television system (which may use coaxial cable, fiber, or any suitable medium). The cable headend 112 may comprise all satellite and electronic equipment, systems, hardware, firmware (including conversion and transmission equipment), software, etcetera, necessary to receive and re-transmit content units over the infrastructure in communication with the cable headend 112 for this purpose and to interact with the set top boxes.

In the illustrated example embodiment, the cable headend 112 receives video content units from the satellite, the database server 101, or another content source. As discussed, in other embodiments, the selected video content units may be obtained by the cable headend 112 for delivery via any suitable means from any suitable source. For example, some video content may be stored locally, some may be received via satellite, and some may be received via a network. In this example, the database server 101, processor 102 and database 115 may server multiple cable headends 112.

The set-top boxes 104a-c comprise interactive devices that connect televisions and other audio-visual devices (e.g., televisions, stereos, etc.) to external sources of video content units, such as the cable headend 112, in a manner that allows users 103 to request and receive video content. The display may comprise a television such as a cathode ray tube ("CRT"), a liquid crystal display ("LCD"), a plasma display panel ("PDP"), or the like. The set top box 104 may comprise a stand alone device or a circuit card configured to be inserted into a television.

The keywords 106a-c, shown in FIG. 1, comprise search terms entered into a set-top box 104 by a user 103 via a remote control. Typically, the keywords 106a-c form part of a search request and are received by the cable headend 112 and provided to the database server 101. The keywords 106a-c may comprise phrases (one or more words) that relate to content which the user wishes to search, which content typically will relate to the subject matter of interest of the user.

Figure 2:
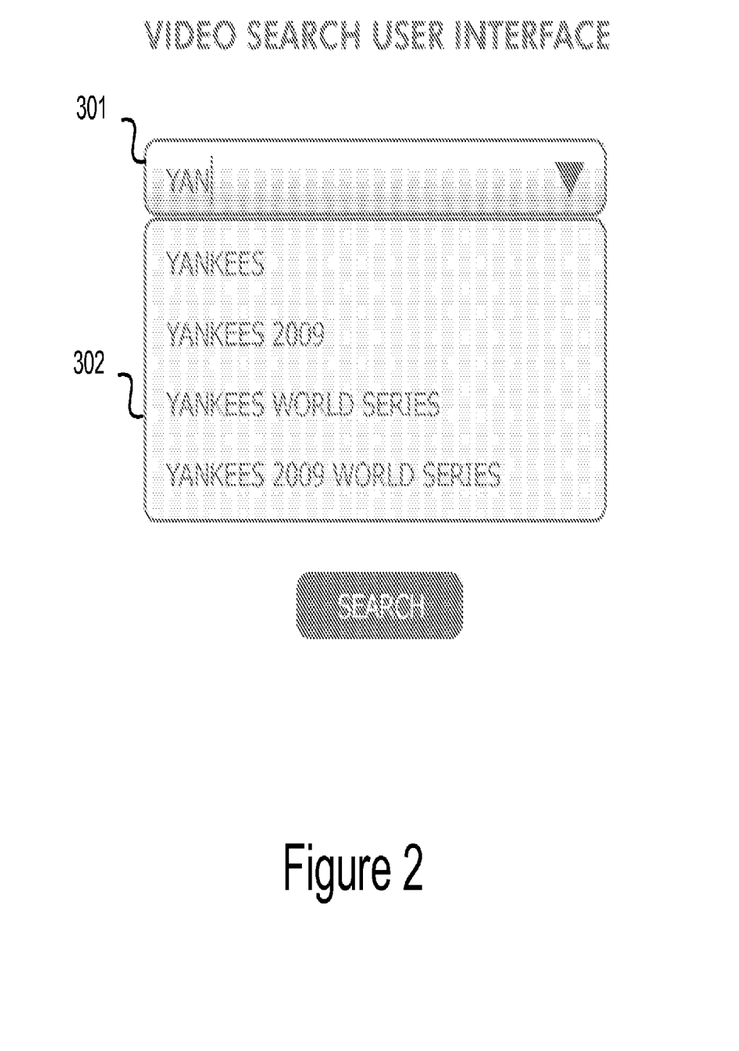
FIG. 2 depicts an example of a video search user interface that includes suggested keywords, according to an example embodiment of the present invention.

As shown in FIG. 2, as the user enters the characters (via the remote control) of the keyword into the query box 301, suggested keywords are provided below the query box in a keyword suggestion menu 302. If the user sees the desired keyword in the keyword suggestion menu, the user can scroll to the desired keyword and select the desired keyword to enter a query for that keyword. If the desired keyword is not present in the keyword suggestion menu 302, the user may enter the entire keyword manually (by inputting additional characters) and press the enter key (on the remote control) to enter the keyword. The keyword and any other search criteria is sent to the cable headend 112 by the set top box 104.

In this embodiment, the suggested keywords populated into the keyword suggestion menu may be stored in local menu of the set top box 104. The cable headend 112 may update (transmit for storage by the set top box 104) the suggested keyword list (which may be stored in the database 115) periodically (e.g., daily or weekly) that is based on new contemporary topics of interest. For example, Olympics might be included as a suggested keyword in memory of the set top box 104 only around the time of the Olympics. Instead or additionally, the suggested keyword list may be updated based on the keyword searches of other users. Thus, if the number of users who enter a first keyword (e.g., baseball) over a given time period (e.g., day, week or month) is greater than a threshold, the first keyword may be added to the suggested keyword list, which is transmitted to all of the set top boxes 104. In response to reception of the search request including keywords 106a-c, the headend 112 provides the search criteria to the database server 101, which searches the transcripts and other fields that may be required by the search request. It is worth noting that the video search interface of FIG. 2 is abbreviated and does not depict all of the search fields available to the user.

In another embodiment, each time the user enters a character the character is transmitted to the cable headend 112 and then to the database server 101. The database server 101 may search and retrieve the appropriate suggested keyword list for the characters entered by the user and transmit the suggested keyword list to the user (via the cable headend 112) for display. Thus, in this embodiment there is no need update the suggest keyword list in each set top box because it only needs to be updated (if at all) in the database 115.

The content library comprises the video content units and form part of or be separate from the database 115. In some embodiments, the content library is in logical communication with the database server 101 (or cable headend 112) via a distributed network, or through other means well-known to those of skill in the art. In the illustrated embodiment, the content units (that are not received via broadcast) are stored in a computer readable database 115 controlled by the database server 101, such as IBM DB2, Oracle, or SQL.

As discussed, the keywords 106a-c are formulated into a database query and then associated with a query execution plan which identifies video content units that satisfy the database query by searching the transcripts of the audio portions of the content units. These database queries may be generated using various languages including SQL, XPATH, and the like. In addition to the keywords 106a-c, the user may also supply other identifiers for creating, or identifying, the proper query execution plan such as the title, and the names of speakers featured in the content units, the ratings, price, genre, subject, channel, or other forms of additional information described above. Thus, the query may include keywords as well other search criteria.

The keywords 106a-c may be formulated into database queries which are dynamic (meaning the query is generated as needed by a user with a form that is unknown until the query is received by the database server 101 and which form is likely to change between requests) or static (meaning the database query is predefined does not change form between requests, although the parametric data values of the query may change).

The dynamic database queries comprising the keywords 106a-c may comprise more than just textualized words or phrases, but also logical bitwise operations that the database server 101 infers were intended by the user 103 such as NOR, OR, XOR, AND, NAND, (or quotes and plus signs) and the like, as well as other information. The users 103a-c may be afforded a great deal of flexibility in searching the content library for not just words and phrases, but combinations of keywords, phrases, genre, channels, and orators featured throughout the content units.

Figure 4:
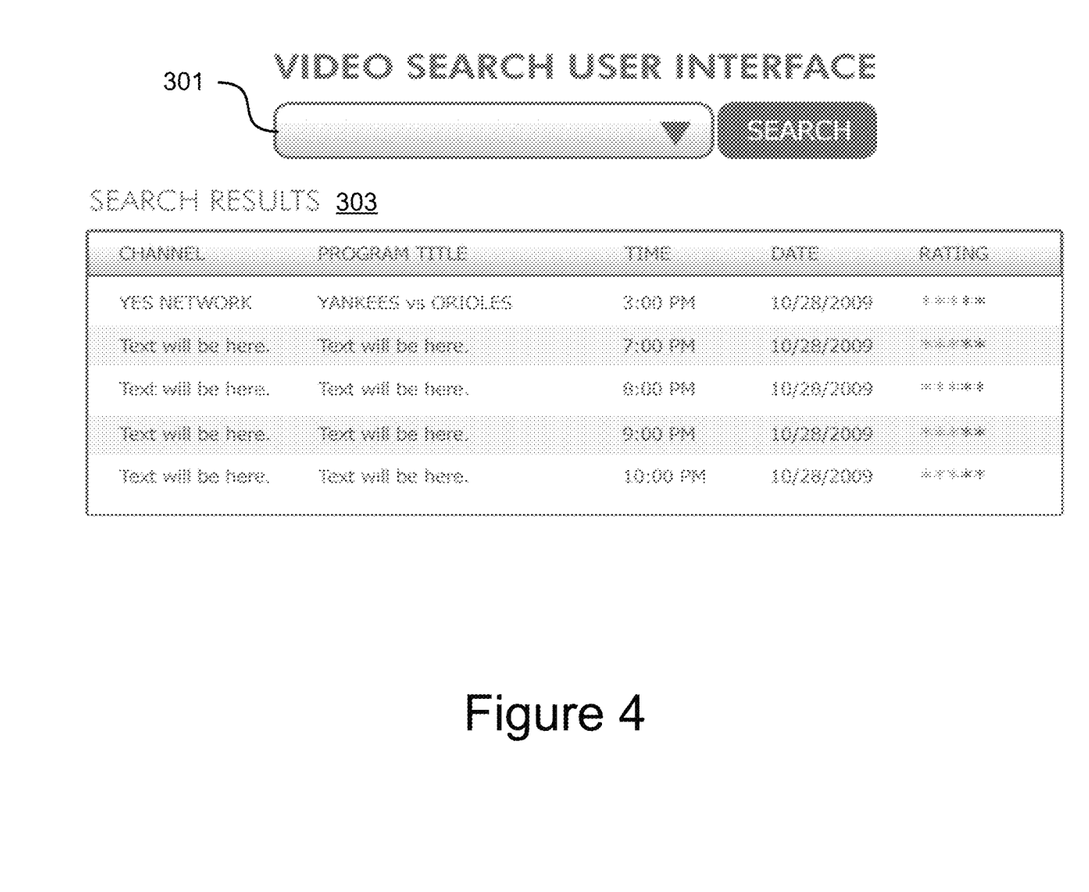
FIG. 4 depicts an example of a video search user interface that includes search results, according to an example embodiment of the present invention.

The content units are described above in the relation to the other components of the dataflow interconnection. In the illustrated example embodiment, the search results 109a-c identify the video content units that satisfy a database query comprising the keywords 106a-c (which database query was applied to the transcripts associated with the content units stored in the content library) and may take the form as shown in FIG. 4.

Figure 3:
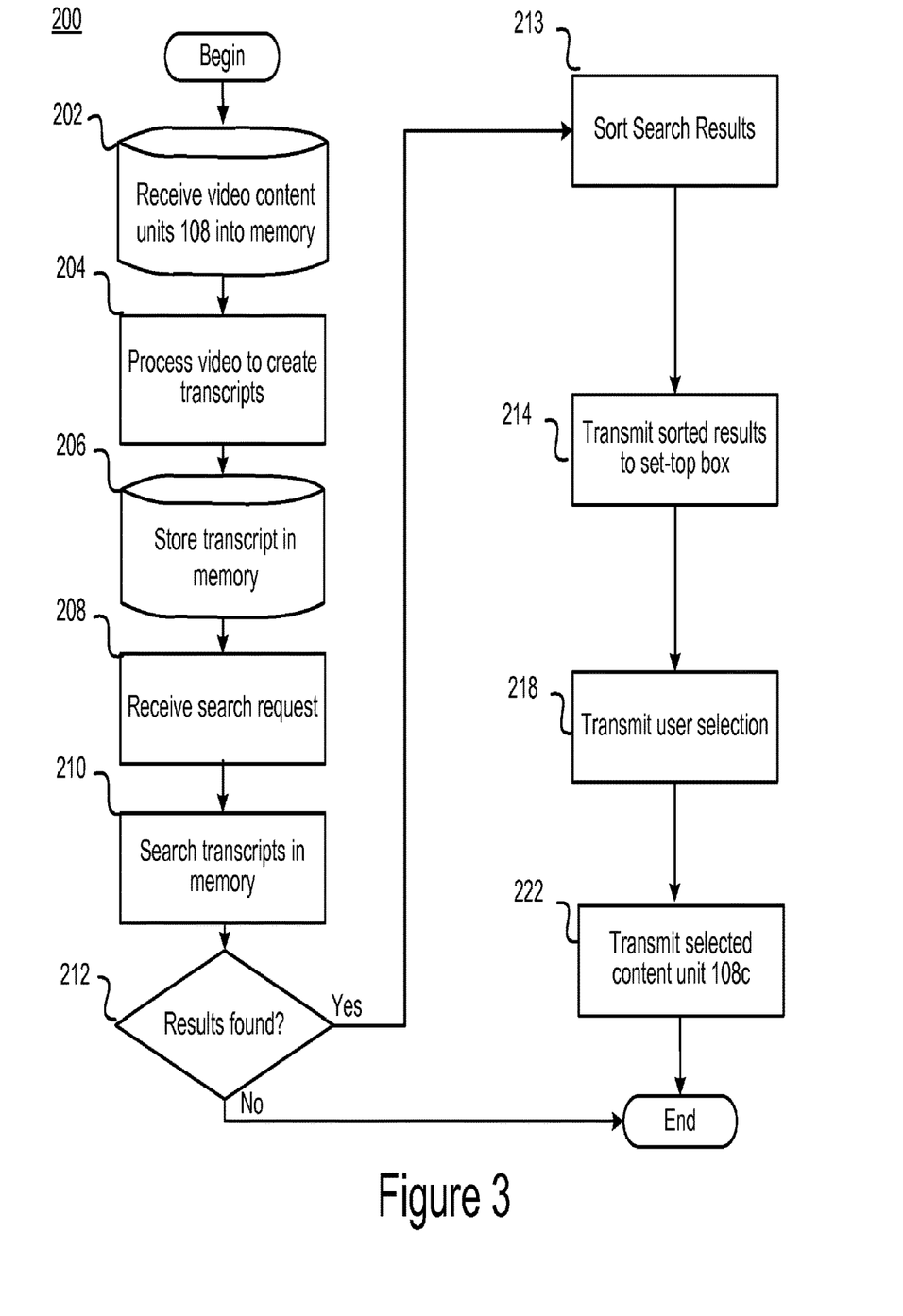
FIG. 3 is a flow chart of a method for processing video data in accordance with an example embodiment the present invention.

FIG. 3 is a flow chart of an example method for processing video data in accordance with the present invention. The method 200 begins by receiving one or more compressed video content units into memory such as into a content library from a content source (e.g., a satellite communication, a network communication, etc.).

The method 200 progresses by processing the video content units to create transcripts of the content units at process 204. Next, the method 200 proceeds with the operation of storing the transcripts in memory, such as in database 115 at 206. Specifically, the stored transcript of each video content unit is stored in memory in association with (e.g., indexed to) information identifying the video content unit from which it was processed as well as the other parameters available for search (e.g., the ratings, price, genre, subject, channel, time slot, title, etc.).

Subsequently, a user 103 enters a search request that includes keywords (e.g., a static or dynamic search request) 106 from the set-top box 104, which request (including keywords) is transmitted to the cable headend 112, which is received at 208.

At 210, the method 200 comprises searching 210 the transcripts in memory for transcripts satisfying a similarity threshold with the keywords of the search request. For example, if a user provided a keyword "UFO," the database server 101 may search the transcripts and identify the video content units that each have an associated transcript that includes the keyword "UFO." If no transcripts include the keywords, the process may transmit a notification to the set top box 104 for display to the user.

As discussed, a search request may include parameters other than keywords. For example, the user may search based on any one or more channels on which the video content unit is to be broadcast (e.g., Discovery Channel®, ABC®, ESPN®, etc.), text in a title, text in a subject (i.e., description), the names of speakers or creators of the audio in the video content unit, duration, Motion Picture Association of American (MPAA) rating information, availability dates of the content unit(s), pricing information associated with the video content units, the media type (e.g., high definition (HD) or not HD), the genre of media featured in the content units (e.g., drama, comedy, horror, sports, news, etc.) and the like. Thus, the set top box 104 may provide a search form with fields to enter these parameters (and others field including keywords) to allow the user to provide a search request to search these parameters. To reduce search time, in this example embodiment only the transcripts of the video content units that satisfy all of the non-keyword parameters are searched.

Subsequently, at 213 information identifying the content units that satisfy the search request (e.g., a list) is sorted based on their conformity to the search request. For example, the content units that satisfy the non-keyword parameters and that include the highest number of the keywords (e.g., the twenty content units that include the most keywords) may be sorted in descending order (i.e., the video content units having the greatest number of keywords sorted at the top of the list).

In addition, in some embodiments the search results may be sorted based on the average user rating associated with each video content unit. For example, the twenty content units that include the most keywords (and that satisfy the other non-keyword parameters) may be sorted based the highest average user rating (i.e., the video content units having the highest average ratings sorted at the top of the list)—instead (or in addition to) being sorted based only on keywords. Furthermore, in addition to the search results, the database server 101 may also access and retrieve information of advertising to be displayed by the set top box concurrently with the search results. For example, based on the search request (the keywords and non-keyword data), the database server 101 may identify one or more video content units (such as video on demand or pay per view that requires the user to pay for the advertised content) to be advertised (listed) at the top of the display above the sorted search results (i.e., advertised) even though these video content units may not satisfy (or not fully satisfy) the search request. In addition to being based on the information forming the search request, the advertising may be selected based on the location of the user, the amount that an advertiser has agreed to pay (such as a bid if the advertisement is selected by the user or displayed to the user) given the keyword, location of the user, and other information. Thus, the advertising may be selected in a manner that is similar to pay per impression or pay per click advertising, where advertisers bid on keywords to have their advertisement presented and, in some embodiments, only pay the operator if their advertisement is selected by the user. The advertising may be for any commercially available product and is not limited to advertising of video content units. For example, the advertising may advertise audio content (MP3 files for downloading via the cable system), electronics, travel services, restaurants, local venders, and any other service or product.

At 214, the search results, which in this example embodiment may comprise a sorted list of video content units having transcripts that satisfy a similarity threshold with the search request (and any advertisements), are transmitted 214 to the set-top box 104 for presentation to a user 103. FIG. 4 depicts an example of a format for displaying search results that may be employed for some embodiments.

The user 103 may select a content unit identified in the search results 109 for viewing by scrolling to through the search results list and selecting the desired video content unit (with the remote control). This user selection is transmitted at 218 by the set-top box 104 to the cable headend 112, which, in response, transmits the selected video content unit to the set-top box 104 for presentation to the user at 222. In some embodiments, the content units identified in the search results 109 may not be available for immediate viewing, and the user 103 may elect to automatically receive and record the content unit when it becomes available (by responding to prompts provided by the set top box 104). In still further embodiments, the content units listed in the search results 109 may be associated with a price which the user 103 must agree to pay before the content unit itself is finally transmitted to the user 103 by the cable headend 112.

In some embodiments, the method 200 further comprises an operation of receiving rating data from the user 103 (e.g., after transmitting the content unit to the user 103 for viewing). The rating data comprises feedback from the user 103 on the quality of the content unit, the desirability of the content unit, or on the subjective degree to which the content unit satisfied the user's 108 user selection (expectations). Example of rating data includes scalable ranges of values, such as 1-100, 1-10, A-F, or 1-5 (e.g., 5 stars).

The rating data may be provided by users 103 through the set-top boxes 104 and supplied to the database server 110 by the cable headend 112. The database server 110 may process each user rating to provide an average user rating which is stored in the database 110 in association with information identifying the video content unit (and transcript). In such an example embodiment, the search results may be sorted based on the average user rating. In addition, the rating may be a non-keyword parameter that the user may include as part of a search request. For example, the user may elect to search for only four and five star movies having a particular keyword.

Figure 5:
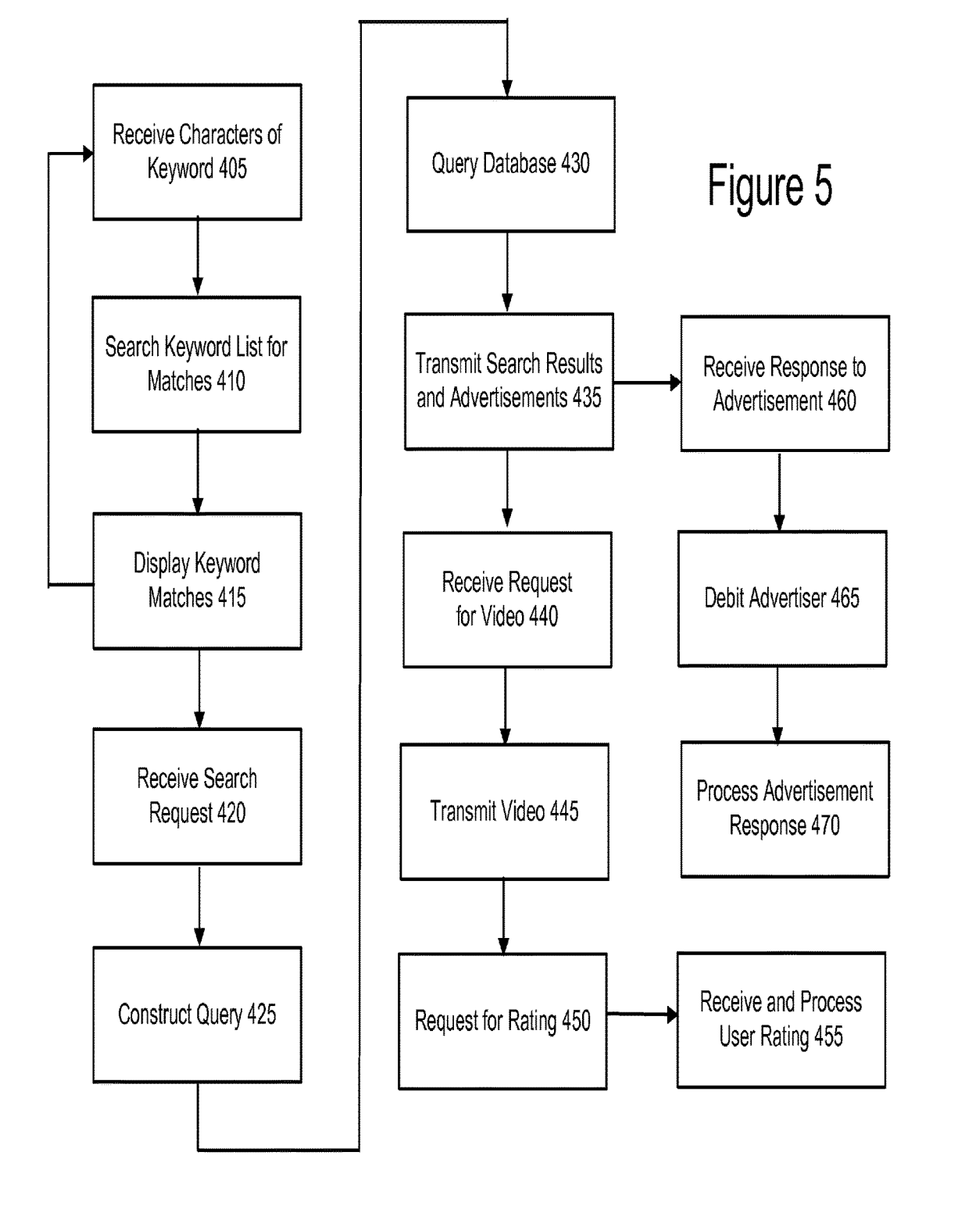
FIG. 5 is a flow chart of a method for responding to search request in accordance with an example embodiment the present invention.

FIG. 5 depicts a process of using an example embodiment of the present invention. At 405, the set top box 104 receives a character for a keyword. At 410, the set top box 104 searches the suggested keyword list to identify keywords (which may be a word or phrase) that include a word that begins with the text entered so far by the user 103. In other embodiments, the suggested keyword list searching may be performed by the cable headend 112, the database server 101, another remote computer system, and/or a combination of these and the set top box 104. At 415, the suggested keywords (the results of the keyword list search) are displayed as shown in FIG. 2. If the user enters another character, the process continues at 405. If the user selects a suggested keyword or presses an enter key on the remote to enter the user provided keyword, the keyword and other search criteria parameters (e.g., selected rating, time slot, category, genre, media type, duration, etc.) are sent to and received by the cable headend 112 and subsequently the database server 101 (at 420). As the user enters each character an advertisement may be received by the set top box 104 (or retrieved from memory) and displayed. The displayed advertisements may be selected based one or more of the suggested keywords displayed (along with advertiser keyword bids), the user's location, the time of day, day of the week, non-keyword search criteria (e.g., a user provided rating, channel, category, etc.) entered by the user, and/or other data. The advertisements selected may be selected by the database server 101 (from the database 115), the set top box (from local memory), the cable headend 112, and/or another computer system.

At 425 the database server 101 (or alternately the set top box 104) constructs a database query based on the search criteria (keyword and other search criteria parameters). At 430, the database server 101 queries the database 115. As discussed above, the data to be queried may be stored in multiple databases in practice. The search results may be sorted based on the degree to which each video matches the search criteria and on the average user rating associated with each video. At 435 all or a portion of the sorted search results are transmitted to the set top box 104 for display to the user along with one or more advertisements. If only a portion of the search results is transmitted, the user may request to see additional search results, which are transmitted from the cable headend 112 to the set top box for display (e.g., along with a new advertisement). At 440 the set top box 104 receives a request for a video listed in the search results. At 445, the requested video content is transmitted by the cable headend 112 (e.g., retrieved from a video source such as the content library or from a live broadcast) to the set top box 104 for display. At 450 a request for a user rating may be displayed by the set top box 104 such as, for example, at the end of (or during the ending credits of) the presentation of the received video content. For example, as the user finishes watching the requested video the set top box 104 may display a dialog box asking the user to enter a number from 1-10 (or select one of 5 displayed stars) for video content just watched. In addition, the prompt for a user rating may also be displayed intermittently while the video content is being displayed—directly over the video content or during a commercial between video segments. At 455 the user rating is received via the set top box 104 by the database server 115 which may process the user rating and store a new average rating (that factors in the user provided rating) to the video content unit. In other embodiments, a separate computer system processes and stores the user rating data.

Instead of selecting a video from the search results, the user may select an advertisement. At 460 data indicating selection of an advertisement is received. In this example embodiment, advertisements are paid for on a per-click basis. Consequently, at 465 an account associated with the selected advertisement may be debited an amount associated with a bid (or the bid amount) supplied by the advertiser. In other embodiments such as those where advertisements are paid for on a per impression basis, the advertisers account may be debited each time the advertisement is presented. It is worth noting that the present invention may be used with both pay per impression and pay per click advertisements simultaneously (i.e., with both types of ads being displayed concurrently).

At 470 the cable headend 112 (or other computer system) processes the response to the advertisement, which may include (1) transmitting additional information for display by the set top box, (2) transmitting an email with additional information to an email address (stored in memory in association with the user) or sending a text message to a telephone of the user, (3) transmitting the advertised video unit or audio content for storage and/or presentation to the user, (4) cause information to be delivered to the home of the user (e.g., via postal mail), (5) execute a purchase (e.g., debit an account associated with the user) and cause a product to be delivered to the user's residence (e.g., food) or service be provided to the user (e.g., a new telephone service be provided).

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method, implemented on a cable network comprising a cable head end, at least one set top box connected to the cable head end, and a computer system in communication with the cable head end, for processing video content and viewing the video content through the at least one set top box in communication with the computer system via the cable head end, comprising:
    processing by the computer system audio portions of a plurality of video content units to create a transcript for each of the plurality of video content units that comprises a textual representation of the dialogue of each video content unit, wherein said processing comprises extracting one of closed caption data and embedded video text from the plurality of video content units;
    storing by the computer system a transcript in a memory of the computer system for each of the plurality of video contents;
    receiving by the cable head end and the cable head end sending to the computer system a search request from a first set top box comprising one or more keywords originating from a first user;
    searching by the computer system at least some of a plurality of transcripts stored in the memory for the one or more keywords;
    identifying by the computer system the search results that comprises a set of video content units having transcripts that satisfy a similarity threshold with the search request;
    receiving by the cable head end and the cable head end sending to the computer system a user quality rating for each video content unit of a multitude of the video content units from a plurality of set top boxes originating from a plurality of users;
    based on user quality ratings, storing by the computer system an average quality rating in the memory in association with each of the respective video content units in the multitude of video content units;
    sorting by the computer system the search results in according to the average quality rating;
    receiving by the cable head end and the cable head end sending to the computer system a search request for a threshold average quality rating from the first set top box by the first user; and
    transmitting by the computer system at least a portion of the sorted search results that meet the threshold average quality rating to the cable head end and the cable head end sending to first set top box for viewing by the first user.

2. The method of claim 1, wherein the content units comprise an MPEG video files compatible with an MPEG decoder.

3. The method of claim 1, wherein at least some of the plurality of video content units comprises live broadcast video content.

4. The method according to claim 1, further comprising the computer system is in communication with the internet.

5. The method according to claim 4, further comprising receiving by the cable head end and the cable head end sending to the computer system a search request from a first remote device comprising one or more keywords originating from a second user;
    receiving by the cable head end and the cable head end sending to the computer system a search request for a threshold average quality rating from the first remote device by the second user; and
    transmitting by the computer system at least a portion of the sorted search results that meet the threshold average quality rating to the cable head end and the cable head end sending to first remote device for viewing by the second user.

6. The method according to claim 5, wherein the first remote device is a telephone.

7. The method of claim 1, wherein at least some of the plurality of video content units comprises a movie or a television program.

8. The method according to claim 1, further comprising extracting additional information from the video content units, storing the additional information in the memory, the additional information comprising at least one of a channel on which the video content is to be broadcast, a title, a subject, a description, a speaker or creator of the audio in the video content unit, Motion Picture Association of American (MPAA) rating information, duration, an availability date of the video content unit, pricing information associated with the video content unit, a media type, or a genre of media featured in the content unit, searching by the computer system the additional information for the one or more keywords;

identifying by the computer system the search results that comprises a set of video content units having additional information that satisfy a similarity threshold with the search request;

sorting by the computer system the search results in according to the average quality rating;

receiving by the cable head end and the cable head end sending to the computer system a search request for a threshold average quality rating from the first set top box by the first user; and transmitting by the computer system at least a portion of the sorted search results that meet the threshold average quality rating to the cable head end and the cable head end sending to first set top box for viewing by the first user.

9. The method according to claim 1, transmitting by the computer system at least a portion of the sorted search results that meet a highest rated content type to the cable head end and the cable head end sending to first set top box for viewing by the first user.

10. The method according to claim 1, transmitting by the computer system at least a portion of the sorted search results that meet a highest rated content for a particular time to the cable head end and the cable head end sending to first set top box for viewing by the first user.

11. The method according to claim 1, further comprising accessing by the computer system each video content unit to process the video content unit to obtain a transcript of the dialogue of each video content unit for storage in the memory.

12. The method according to claim 1, wherein after receiving the keyword request from the first user said computer system generating a plurality of suggested keywords and sending the suggested keywords to the cable head end and the cable head end sending the suggested keywords to the first set top box for viewing by the first user.

13. The method of claim 12, further comprising the computer system receiving a selection of one of the suggested keywords from the first user.

14. The method of claim 1, further comprising selecting a video content by the first user, the cable head end sending to the first set top box the selected video content, and displaying to the first user the selected video content.

15. The method according to claim 14, further comprising displaying a request to rate the video content and wherein first user rating data is received in response to said displaying.

16. The method of claim 15, wherein said request is displayed while the video content is being presented.

17. The method of claim 1, further comprising by the computer system selecting an advertisement based on the keyword and sending the advertisement to the cable head-end, sending by the cable head end to the first set top box the advertisement.

18. The method of claim 16, further comprising receiving a notification indicating a first user response to the advertisement; and in response, transmitting additional information to the first set top box related to a product or service advertised in the first advertisement.

19. The method according to claim 12, wherein the suggested keywords are formulated into queries which are dynamically generated as needed by a user with a form that is unknown until the query is received by the computer system and which form is likely to change between different requests.

20. The method according to claim 12, further comprising receiving by the cable head end a selected suggested keyword from the first set top box and the cable head end sending the selected suggested keyword to the computer system;

searching by the computer system at least some of a plurality of transcripts stored in the memory for the suggested keyword;

identifying by the computer system the search results that comprises a set of video content units having transcripts that satisfy a similarity threshold with the search request;

sorting by the computer system the search results in according to the average quality rating;

receiving by the cable head end and the cable head end sending to the computer system a search request for a threshold average quality rating from the first set top box by the first user; and transmitting by the computer system at least a portion of the sorted search results that meet the threshold average quality rating to the cable head end and the cable head end sending to first set top box for viewing by the first user.

* * * * *